Oct. 20, 1959 E. P. AGHNIDES Re. 24,721

ASH TRAY WITH CAVITIES FOR EXTINGUISHING CIGARETTES

Original Filed May 18, 1953

INVENTOR

Elvie P. Aghnides

BY Moore and Hall

ATTORNEYS

United States Patent Office

Re. 24,721
Reissued Oct. 20, 1959

24,721

ASH TRAY WITH CAVITIES FOR EXTINGUISHING CIGARETTES

Elie P. Aghnides, New York, N.Y.

Original No. 2,798,498, dated July 9, 1957, Serial No. 355,816, May 18, 1953. Application for reissue October 10, 1957, Serial No. 689,463

8 Claims. (Cl. 131—235)

Matter enclosed in heavy brackets [ ] appears in the original patent but forms no part of this reissue specification; matter printed in italics indicates the additions made by reissue.

This invention relates to ash trays and more particularly to those having small cavities for extinguishing cigarettes.

One object of this invention is to provide an ash tray with numerous small cavities for extinguishing cigarettes in which the cavities operate more efficiently in accomplishing their intended function than heretofore.

Another object of this invention is to provide an ash tray provided with numerous small cavities for extinguishing cigarettes in which the small cavities may be used more than once without the necessity of emptying the butts from the ash tray.

Another object of the invention is to provide an ash tray that is safer in use and less likely to be a fire hazard than prior art ash trays.

Yet another object of this invention is to provide an ash tray that is easy to clean.

A further object of the invention is to provide an ash tray upon which a cigarette may rest between smokes and which limits the contact between the cigarette and the ash tray to a very small area, whereby wetting of the cigarette paper is avoided when the cigarette is resting on the ash tray.

In carrying out the foregoing objects, I provide an ash tray with upper and lower parts which so nest together as to form a plurality of small cavities into which burning cigarettes may be dropped to extinguish them. The cross-section of the upper end of the cavity is large enough to allow ready insertion of the cigarette therein and the lower end of the cavity is preferably of such small cross-section that a burning cigarette dropped therein is soon extinguished due to lack of air. Novelty also resides in the arrangement for forming the small cavities, and in an arrangement whereby the cigarette butts may be removed from the small cavities into a larger tray by merely lifting partially or completely the upper nested part. Various other features of novelty will appear as this description proceeds.

Figure 1:
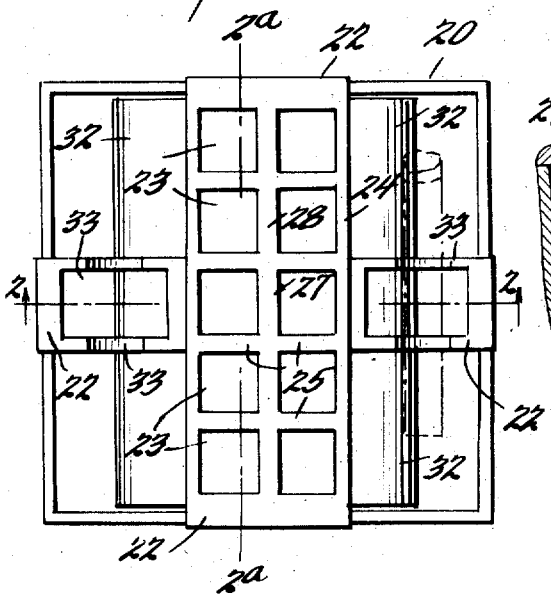
Figure 1 is a plan view of one form of the invention.
Figure 2A:
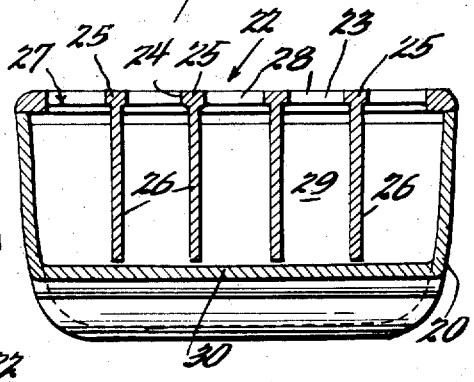
Figure 2a is a cross-section taken along line 2a—2a of Figure 1.
Figure 2:
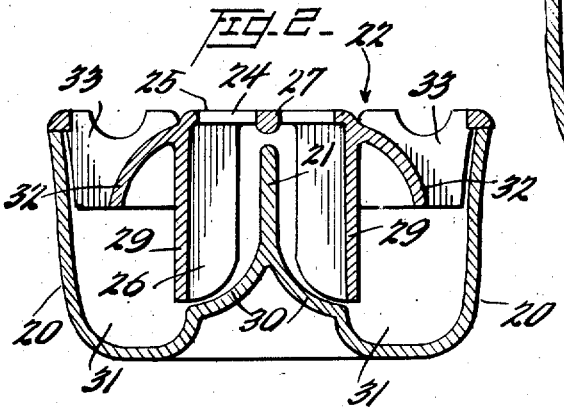
Figure 2 is a cross-section taken along line 2—2 of Figure 1.

In Figures 1 and 2, the ash tray has a lower outer bowl 20 having an integral upstanding partition 21 which runs the length of the lower bowl. A removable upper member 22 has a central perforated portion having ten openings 23 defined by the grid 24. Located under each of the several cross-members or ribs 25 is a web 26 which together with the partition 21 divides the space below the grid 24 into ten cavities, with an opening 23 above each cavity. Aligned with the top edge of partition 21 is an elongated projection 27, the upper surface of which constitutes rib 28. Since the upper part 22 carries vertical panels 29 the cavities are substantially wholly enclosed except at their upper ends.

When the smoker desires to extinguish his cigarette he merely drops it into one of the cavities 23 with the burning end facing downwardly. A separate cavity is provided for each cigarette to be extinguished, and when all of the cavities 23 are filled the smoker merely lifts the upper part 22 a few inches above the lower part. This allows the cigarette butts to fall off of the sloping ledges 30 into the outer cavities 31. In order to render the butts in cavities 31 as obscure as possible overhanging lips 32 are provided. These are located adjacent cigarette rests 33, as shown in order to deflect ashes etc. which may fall or be placed in the ash cavities 31 away from the shoulders between the members 30 and 31 so that the space adjacent and below the shoulders may be maintained clear to receive butts etc., from the extinguishing cavities.

Figure 3:
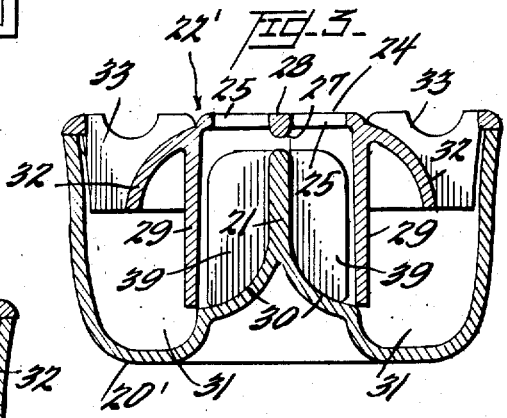
Figure 3 is a modified form of the invention.

Figure 3 illustrates a modified form of the device in which the webs 39 [carried by the upper part 22'] are similar to the webs 26 of Figure 2 and are integral with the lower part 20'; otherwise the construction of Figure 3 is identical with that of Figure 2.

In all forms of this invention the size of the cigarette cavity may be reduced in its cross-section as the depth increases either by thickening the webs, or inclining the walls or both [as shown in Figure 8]. The cavity is preferably made large enough at its top to readily receive a cigarette, and becomes smaller at its bottom portion, so that when the lower end of each cavity is only slightly larger in cross-section than the cross-section of the cigarette the latter will readily be extinguished. A bottom portion of elongated cross section as narrow as the diameter of a cigarette will give comparable results and it will, moreover, provide space for the ashes disposed of in the cavities.

This application is related to my prior copending applications as follows: Serial 183,542 filed September 7, 1950, now U.S. Patent No. 2,710,611 issued June 14, 1955, entitled, Ash Tray, Serial No. 301,515 filed July 29, 1952 entitled, Ash Tray With a Large Number of Cavities for Extinguishing Cigarettes, Serial No. 301,516, filed July 29, 1952, entitled, Ash Tray With Cavity for Reception of Ashes, Serial No. 301,517, filed July 29, 1952 entitled, Ash Tray With Improved Means for Extinguishing Cigarettes, and Serial No. 301,518 filed July 29, 1952 entitled, Ash Tray With Improved Cavities for Extinguishing Cigarettes.

In connection with all forms of the invention the cavities are so deep that the smoker ordinarily cannot crush his cigarette butt against the bottom of the cavity, say at least one half inch or more deep. The cavities at their upper ends are substantially larger than a cigarette and at their lower ends are preferably of much smaller cross-section than the openings at the upper ends so that the cigarette ends dropped in the cavities extinguish faster than they would otherwise.

The openings shown in the drawings are rectangular in shape but obviously could be round, oval or of any other shape.

The ash trays described herein could be made of molded material such as glass, plastic, etc. could be cast, or made in any other suitable way or of any other suitable material.

While there have been described above what are at present believed to be the preferred forms of the invention, other forms will suggest themselves to those skilled in the art. All such variations as fall within the true spirit of the invention are intended to be covered by the generic terms of the claims set forth below.

I claim to have invented:

1. An ash tray comprising a bowl and a removable top, said top comprising a grid having cigarette rests and lip members extending transversely to each other, said grid having means adapted to provide extinguishing cavities adjacent to ash receiving cavities, said bowl having side walls, a bottom, a flat bottom portion providing bottom walls for said ash receiving cavities, and inclined portions forming the bottoms of said extinguishing cavities, said inclined portions forming shoulders adapted to convey extinguished butts into said ash receiving cavities when said grid is raised and separated from the bowl, and said lip being adapted to convey ashes which may fall from a cigarette in a rest away from that portion of the ash receiving cavities which is adjacent said shoulders thereby maintaining said ash receiving cavities available for repeated use to receive stubs from said extinguishing cavities.

2. The combination set forth in claim 1, said bowl having an upstanding partition therein and spaced from the side walls thereof.

3. The combination set forth in claim 2, said shoulders being raised from the bottom of the bowl and having upwardly extending portions merging into a vertical tray partition.

4. The combination set forth in claim 3, said top being vertically movable and having a pair of depending walls with one wall spaced from said partition on each side thereof so as to define a pair of chambers above said shoulders.

5. The combination set forth in claim 1, the walls of said bowl sloping outwardly, said top having a portion resting on the upper edge of said bowl and extending thereabove.

6. The combination set forth in claim 1, said top comprising four grids in the form of a cross and leaving the corner portions of said bowl covered only by said lip members which curve downwardly in the direction of opposite walls of said bowl.

*7. A smoker's ash tray comprising a bowl, said bowl having a wall upstanding from its bottom which divides the bowl cavity into sub-cavities, a removable open-topped upper part comprising an upper portion adapted to lie on opposite sides of and in spaced relation to said upstanding wall and having at least one depending wall, and webs on at least one of said walls, said webs dividing the spaces between the upstanding and depending walls into cells adapted to receive cigarette ends introduced into them through the open top of the upper part.*

*8. The combination set forth in claim 7, said upstanding wall being substantially plane and extending from one side of said bowl to the other.*

References Cited in the file of this patent or the original patent

UNITED STATES PATENTS

| | | |
|---|---|---|
| D. 144,410 | Newman | Apr. 9, 1946 |
| 813,918 | Schmitz | Feb. 27, 1906 |
| 1,614,910 | Yarder | Jan. 18, 1927 |
| 1,688,887 | Spreen | Oct. 23, 1928 |
| 2,029,139 | Szabo | Jan. 28, 1936 |
| 2,182,454 | Sherman | Dec. 5, 1939 |
| 2,220,784 | Gee | Nov. 5, 1940 |
| 2,470,501 | Leaman | May 17, 1949 |
| 2,480,816 | Turulis | Aug. 30, 1949 |
| 2,518,849 | Agee | Aug. 15, 1950 |
| 2,577,959 | Gattuso | Dec. 11, 1951 |
| 2,733,721 | Kitchens et al. | Feb. 7, 1956 |

FOREIGN PATENTS

| | | |
|---|---|---|
| 32,080 | Netherlands | Feb. 15, 1934 |
| 299,186 | Great Britain | Oct. 25, 1928 |
| 422,431 | Great Britain | Jan. 11, 1935 |
| 536,128 | Great Britain | May 5, 1941 |
| 617,670 | Great Britain | Feb. 9, 1949 |